United States Patent [19]

Hanlon et al.

[11] Patent Number: 5,796,812
[45] Date of Patent: Aug. 18, 1998

[54] METHOD FOR TRANSFERRING CALL-SPECIFIC DATA BETWEEN CALLED PARTIES

[76] Inventors: Edite M. Hanlon, 16 Cloverhill La.; Steven T. Heinsius, 214-C Harding Rd., both of Freehold, N.J. 07728; Mrinalini Natarajan, 4775 Lake Trail Dr. #2A, Lisle, Ill. 60532; Antoinette Rule, 5 Windfall La., Trenton, N.J. 08690; Tejanand Sarju, 937 Manhattan Ave., Brooklyn, N.Y. 11222; Gary D. Walden, 179 W. Valley Brook Rd., Califon, N.J. 07830

[21] Appl. No.: 649,874

[22] Filed: May 13, 1996

[51] Int. Cl.⁶ .................................................. H04M 3/58
[52] U.S. Cl. ...................... 379/212; 379/207; 379/265; 370/264
[58] Field of Search ................................ 379/210, 211, 379/212, 265, 266, 220, 221, 207; 370/260, 261, 262, 264

[56] References Cited

U.S. PATENT DOCUMENTS

| 4,723,273 | 2/1988 | Diesel et al. | 379/210 |
|---|---|---|---|
| 5,008,930 | 4/1991 | Gawrys et al. | 379/210 |
| 5,181,239 | 1/1993 | Jolissaint | 379/266 |
| 5,432,845 | 7/1995 | Burd et al. | 379/210 |
| 5,469,504 | 11/1995 | Blaha | 379/265 |

*Primary Examiner*—Ahmad F. Matar
*Attorney, Agent, or Firm*—Robert B. Levy

[57] ABSTRACT

A re-directing party (14) may transfer call-specific data to a target party (16) via a telecommunications network (10) in connection with the re-direction of a telephone call by the network between the parties. To transfer the call-specific data, the re-directing party transmits an out-of-band message containing the data to the network. The network forwards the data in an out-of-band message to the target party. The message may be one that effects call set-up to the target party or call termination by the re-directing party. Alternatively, the message may be of the type that effects data transfer during the call itself.

8 Claims, 1 Drawing Sheet

METHOD FOR TRANSFERRING CALL-SPECIFIC DATA BETWEEN CALLED PARTIES

TECHNICAL FIELD

This invention relates to a technique for transferring call-specific data from one party to another together with or after a telephone call that is re-directed from the one party to the other.

BACKGROUND ART

In some circumstances, it is desirable to continue processing a telephone call made by a calling to a called party after the called party has answered. As an example, a manufacturer of goods may find it desirable to contract with one or more separate service organizations to provide warranty and out-of warranty service on certain products. Despite having contracted with a separate service organization to provide such service, the manufacturer may want to screen incoming service calls rather have such calls directly terminate at one of the contracted service organizations. For instance, the manufacturer may want to screen calls for the purpose of ultimately transferring such calls to different service organizations depending on the type of product for which service is sought, or the location where the service is required.

U.S. Pat. No. 5,432,845 incorporated by reference herein, discloses a technique for accomplishing post-answer call redirection, thus allowing the manufacturer in the above example to readily re-direct calls to one or more independent service organizations. While call re-direction can be readily accomplished, there has been no effective way to transfer call specific data between the re-directing party and the target party to whom the call is re-directed. Prior to re-direction of a call, a caller may have provided the redirecting party with certain data. After the call has been re-directed to the target party, that party will likely ask the caller the same questions previously asked by the re-directing party. This can be very frustrating for the caller.

Thus, there is a need for a technique that transfers call-specific data along with a telephone call that is re-directed from a re-directing party to a target party.

BRIEF SUMMARY OF THE INVENTION

Briefly, a method is provided for transferring call-specific data within a telecommunications network between a re-directing and a target party in conjunction with the re-direction of a telephone call from the re-directing party to the target party. In accordance with the invention, upon receipt of a telephone call that the re-directing party wishes to re-direct, the re-directing party transmits an out-of-band signal to the network to cause the network to re-direct the call to the target party. If the re-directing party wishes to transfer call-specific data to the target party in connection with the re-direction of the call, re-directing party places the call-specific data in a message that is transmitted by the network to the target party out-of band from the initially-received call. Typically, the message containing the call-specific data is transmitted as part of a message on a data channel within an ISDN link coupling the re-directing party to the network. The message containing the call-specific data is then forwarded to the target party along with the re-directed call, typically via an ISDN link coupling the target party to the network. The message can be sent as part of call set up to the target party or as part of a message from the re-directing party 14 to terminate that portion of the call path between the re-directing party and the caller. Alternatively, the call-specific data can be sent during such time that the call paths between the caller and the re-directing party 14 and between the re-directing party and the target party remain connected.

DETAILED DESCRIPTION

Figure 1:
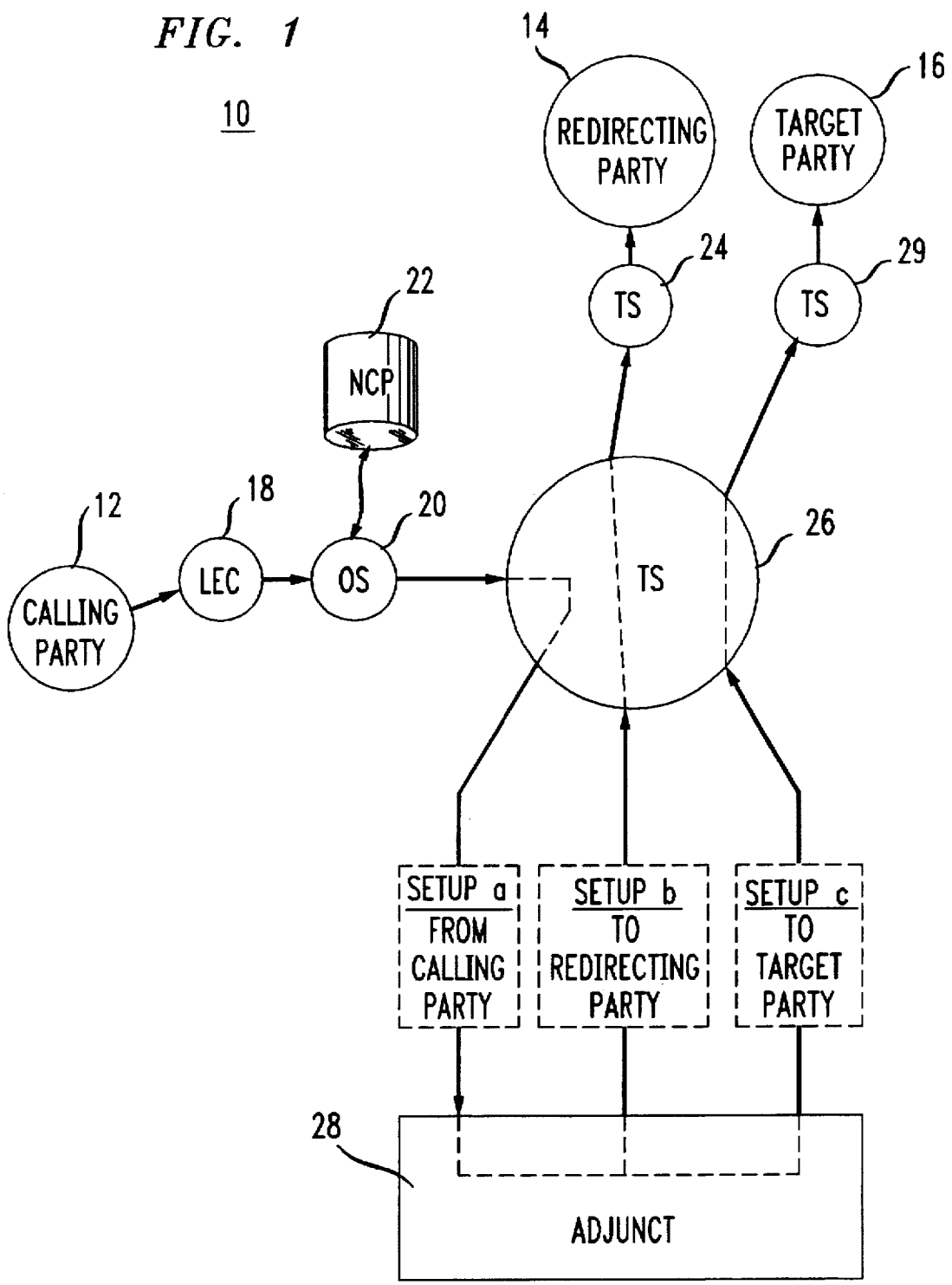
FIG. 1 is a block schematic diagram of telephone network for transferring call-specific data from a re-directing party to a target party in conjunction the re-direction of a telephone call between the parties.

FIG. I illustrates a telephone network 10 for routing a telephone call from a calling party 12 to one or more called parties 14 and 16. For reasons that will become better understood, the called parties 14 and 16 will hereinafter be referred to as the re-directing and target parties, respectively. Typically, the calling party 12 receives telephone service (dial tone) via a Local Exchange Carrier (LEC) 18. When the calling party 12 goes off hook and enters the digits of a called party (i.e., the re-directing party 14), the call initiated by the called party is received at the LEC 18. In the illustrated embodiment, the re-directing party 14 is presumed to have an 800 or 888 number that is toll-free to the calling party 12. Under such circumstances, the LEC 18 routes the call to an Inter-Exchange Carrier (IXC), such as AT&T, for receipt at an originating switch (OS) 20 maintained by the IXC.

Upon receipt of the call originated by the calling party 12, the OS 20 queries a Network Control Point (NCP) 22 that determines the proper routing for the call. In particular, the NCP 22 determines the appropriate terminating switch (TS) 24 to which the call should be routed for delivery to the re-directing party 14. In the process of routing the call from the OS 20 to the TS 24, the call may pass through at least one other terminating switch, such as TS 26. In practice, the TS 26 typically includes an adjunct processor 28 that cooperates with the switch to enable the switch to perform certain functions described hereinafter, including set-up of the call received by the OS 20 for receipt by the TS 24. The functionality afforded by the adjunct processor 28 could be readily included within the TS 26 itself, thus obviating the need for the adjunct processor.

After initially screening the call, the re-directing party 14 may wish to re-direct the call to the target party 16 who is served by a Terminating Switch (TS) 29 coupled to the TS 26. To re-direct the call, the re-directing party 14 enters a call re-direction request to the TS 24. In the illustrated embodiment, the re-directing party 14 subscribes to ISDN. Under such circumstances, the re-directing party request to re-direct the call comprises an out-of band signal sent to the TS 24. As distinguished from an in-band signal, an out-of band signal is sent via a data channel separate from the bearer channel that carries the call. The advantage of an out-of-band re-direction trigger is that the likelihood of "talk-off" is virtually eliminated. Talk-off occurs when an a caller's voice simulates a Dual-Tone Multi Frequency (DTMF) in-band signal, causing confusion as to whether an in-band trigger was indeed received.

Typically, the out-of-band re-direction request (often referred to as a "trigger") typically specifies the complete number of the target party 16. However, if the re-directing party 14 subscribes to a speed dial service, the out-of-band request may only specify a corresponding speed dial code associated with the target party 16. Such a speed dial request would then be translated to yield the complete number of the target party 16.

Upon receipt of the call re-direction request, the request is then acknowledged. The TS 24 relays the call re-direction request received from the re-directing party 14 to TS 26. As seen in FIG. 1, the TS 26, in combination with the adjunct processor 28, serves both the TS 24 and the TS 29 that serves the target party 16. In response to the re-direction request, the adjunct processor 28 causes the TS 26 to set-up a call to the target party 16 via the TS 29 while placing the calling party on hold. Once the target party 16 has answered, the re-directing party 14 may wish to engage in a conversation before signaling the TS 26 to remove the caller from hold and merge the call paths to re-direct the call to the target party. It is possible for re-directing party to drop the target party 16 prior to removing the calling party from hold. Alternatively, the re-directing party 16 could drop the target party and consult with another target party (not shown) prior to removing the caller from hold and connecting the call paths. Indeed, the re-directing party 14 may wish to drop off after effecting call re-direction.

In accordance with the invention, call specific data, as defined hereinafter, may be advantageously transferred from re-directing party 14 to the target party 16 in connection with call re-direction, provided that both parties subscribe to ISDN service. After deciding to re-direct the call, the re-directing party 14 enters the appropriate "trigger" to re-direct the call as discussed. To transfer information to the target party 16, the re-directing party 14 places such call-specific data in an out-of band message as a User-To-User Interface Information Element (UUI IE) within that message. A typical message of the type utilized in connection with ISDN service has some 192 octets (eight-bit bytes) that can be utilized to carry call-specific data from the re-directing party 14 to the target party 16. Thus, caller-entered information received by the re-directing party 14, such as the caller's address, telephone number, account number, etc. can be readily transferred via the UUI IE in the message to the target party 16. The call-specific information need not be limited to caller-entered data. Such call specific data may include information generated by the re-directing party 14 that is specific to the call. For example, the re-directing party may place in the UUI IE account balance information associated with the caller. What is important is that the information be specifically related to the call itself rather than some abstract parameter.

The UUI IE sent by the re-directing party 14 is received at the TS 26. Under the control of the adjunct processor 28, the UUI IE is sent to the TS 29 for receipt by the target party 16. There are several possible mechanisms by which a data-containing message could be sent from the re-directing party 14 to the target party 16. Consider the situation when the re-directing party 14 wishes to re-direct the call without continuing on the call. To initiate such call re-direction, the re-directing party 14 enters an out-of-band trigger. The adjunct processor 28 (or alternatively, the TS 26 in the absence of the adjunct processor) acknowledges the request by sending the re-directing party 14 an acknowledgment. After sending the acknowledgment, the adjunct processor 28 (or the TS 26) starts a timer. Should the re-directing party 14 send a disconnect request via a corresponding message containing call-specific data to be transferred before the timer times out, the call-specific data is transferred to a message that is sent out-of-band to the target party 16 in connection with call set up.

The re-directing party 14 may wish to remain on the call following call re-direction to the target party 16. Under such circumstances, the re-directing party 14 typically triggers this type of call re-direction by sending an out-of-band message requesting call re-direction as discussed previously. Such a re-direction message also includes the UUE IE containing the call-specific data. The data-containing message generated by the re-directing party 14 is received by the adjunct processor 28 and is thereafter acknowledged. The adjunct processor 28 takes the call-specific data and places it in UUE IE portion of a set-up message send to the TS 29 to set up the call with the target party 16.

However, the UUI IE need not necessarily be sent as part of the message incorporated within the set-up of a call to the target party 16 or associated with call termination. Rather, the UUI IE containing the call-specific data could be sent as part of a message generated by the re-directing party 14 to effect data transfer after call re-direction. As discussed, the re-directing party 14 requests band call re-direction request by entering an out-of band request. After the call is re-directed pursuant to the request of the re-directing party 14, the re-directing party may transfer the call-specific data to the target party 16 by sending a data-transfer message containing the call-specific data to the TS 24 for transmission via the TS 26 to the TS 29. The message received at the TS 29 is then set to the target party 16.

The foregoing describes a technique for transferring call-specific data from a re-directing party to a target party in connection with re-direction of a call between the parties.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for transferring data within a telecommunications network obtained by a re-directing party from a calling party following answering of a call by the re-directing party from the calling party, the data transferred from said re-directing party to a target party in connection with re-direction of the telephone call answered by the re-directing party to the target party, the method comprising the steps of:

generating an out-of-band re-direction request to signal the network to re-direct the call from the re-directing party to the target party;

generating an out-of-band message for transfer to the target party containing said data obtained by the re-directing party following answering of said call from the calling party;

transmitting, from the re-directing party to the network, the message containing the data obtained by the re-directing party following answering of said call from the calling party; and forwarding the data from the network to the target party together with the re-directed call.

2. The method according to claim 1 wherein the out-of-band call-specific data-containing message is a message for effecting set-up of a call to the target party.

3. The method according to claim 1 wherein the out-of-band call-specific data-containing message is a message for effecting disconnection of the call from the re-directing party.

4. The method according to claim 1 wherein the out-of-band call-specific data-containing message is a message for effecting transfer of data from the re-directing party to the target party after call set-up to the target party but prior to call disconnection from the re-directing party.

5. A method for transferring data within a telecommunications network obtained by a re-directing party from a calling party following answering of a call by the re-directing party from the calling party, the data transferred from the redirecting party, coupled to the network via a first ISDN link in connection with redirection of the call to a target party coupled to the network via a second ISDN link, the method comprising the steps of:

generating an out-of-band re-direction request to signal the network to re-direct the call from the re-directing party to the target party;

generating an out-of-band ISDN message, for transfer from the re-directing party to the target party, containing the data obtained by the re-directing party from a calling party following answering of the call by the re-directing party;

transmitting the ISDN message containing the data from the re-directing party to the network across the first ISDN link; and forwarding the data from the network to the target party together with the re-directed call across the second ISDN link.

6. The method according to claim 5 wherein the out-of-band ISDN call-specific data-containing message effects set-up of a call to the target party.

7. The method according to claim 5 wherein the out-of-band ISDN call specific data-containing message effects disconnection of the call from by the re-directing party.

8. The method according to claim 5 wherein the out-of-band ISDN call specific data-containing message effects transfer of data from the re-directing party to the target party after call set-up to the target party but prior to call disconnection of the re-directing party.

* * * * *

UNITED STATES PATENT AND TRADEMARK OFFICE
CERTIFICATE OF CORRECTION

PATENT NO. : 5,796,812
DATED : August 18, 1998
INVENTOR(S) : Edite M. Hanlon, et. al.

It is certified that error appears in the above-identified patent and that said Letters Patent is hereby corrected as shown below:

Title page, item [73], Assignee: insert --AT&T Corp.--.

Signed and Sealed this

Eleventh Day of July, 2000

*Attest:*

Q. TODD DICKINSON

*Attesting Officer*     *Director of Patents and Trademarks*